United States Patent [19]

Ashford

[11] 4,138,597
[45] Feb. 6, 1979

[54] PCM TIME SLOT EXCHANGE

[75] Inventor: Donald A. Ashford, Stamford, Conn.

[73] Assignee: International Telephone and Telegraph Corporation, Nutley, N.J.

[21] Appl. No.: 830,525

[22] Filed: Sep. 6, 1977

[51] Int. Cl.² .......................... H04J 6/02; H04Q 11/04
[52] U.S. Cl. ............................. 179/15 AS; 179/15 AQ
[58] Field of Search ........ 179/15 AS, 15 AQ, 15 AT, 179/15 AL; 178/50

[56] References Cited

U.S. PATENT DOCUMENTS

| | | | |
|---|---|---|---|
| 3,678,205 | 7/1972 | Cohen et al. | 179/15 AQ |
| 3,761,894 | 9/1973 | Pilc et al. | 179/15 AQ X |
| 4,032,719 | 6/1977 | Blasbalg | 179/15 AS |

Primary Examiner—Thomas A. Robinson
Attorney, Agent, or Firm—John T. O'Halloran; Alfred C. Hill

[57] ABSTRACT

The exchange includes an input-output bus having a plurality of lines, predetermined ones of which are coupled to a different one of a plurality of peripheral information units. Each of the units are coupled to an associated one of the predetermined one of the lines through a transmission gate under control of an address detector. A random access memory is coupled to each of the predetermined ones of the plurality of lines to sequentially store and release the information of an addressed unit in the exchange selectively on command. A stored program is coupled to the random access memory to selectively command the random access memory and is coupled to others of the plurality of lines which are in turn coupled to the address detectors to selectively control the routing of the information of an addressed unit through the exchange. A timing source coupled to further ones of the plurality of lines provides an incoming timing signal and an outgoing timing signal cooperating with the stored program to selectively control the passage of the information of an addressed unit through the exchange to an addressed one of the units.

27 Claims, 3 Drawing Figures

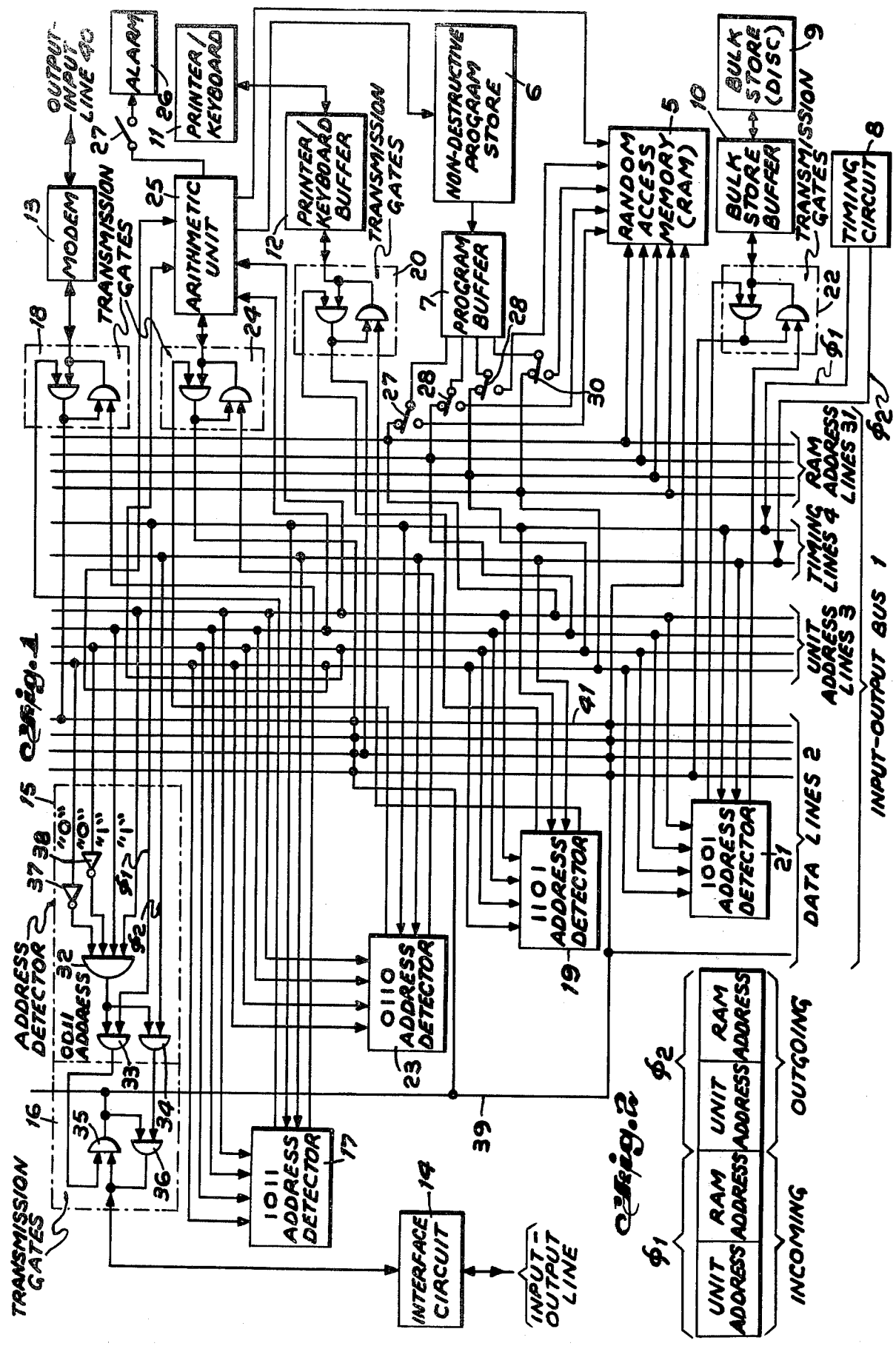

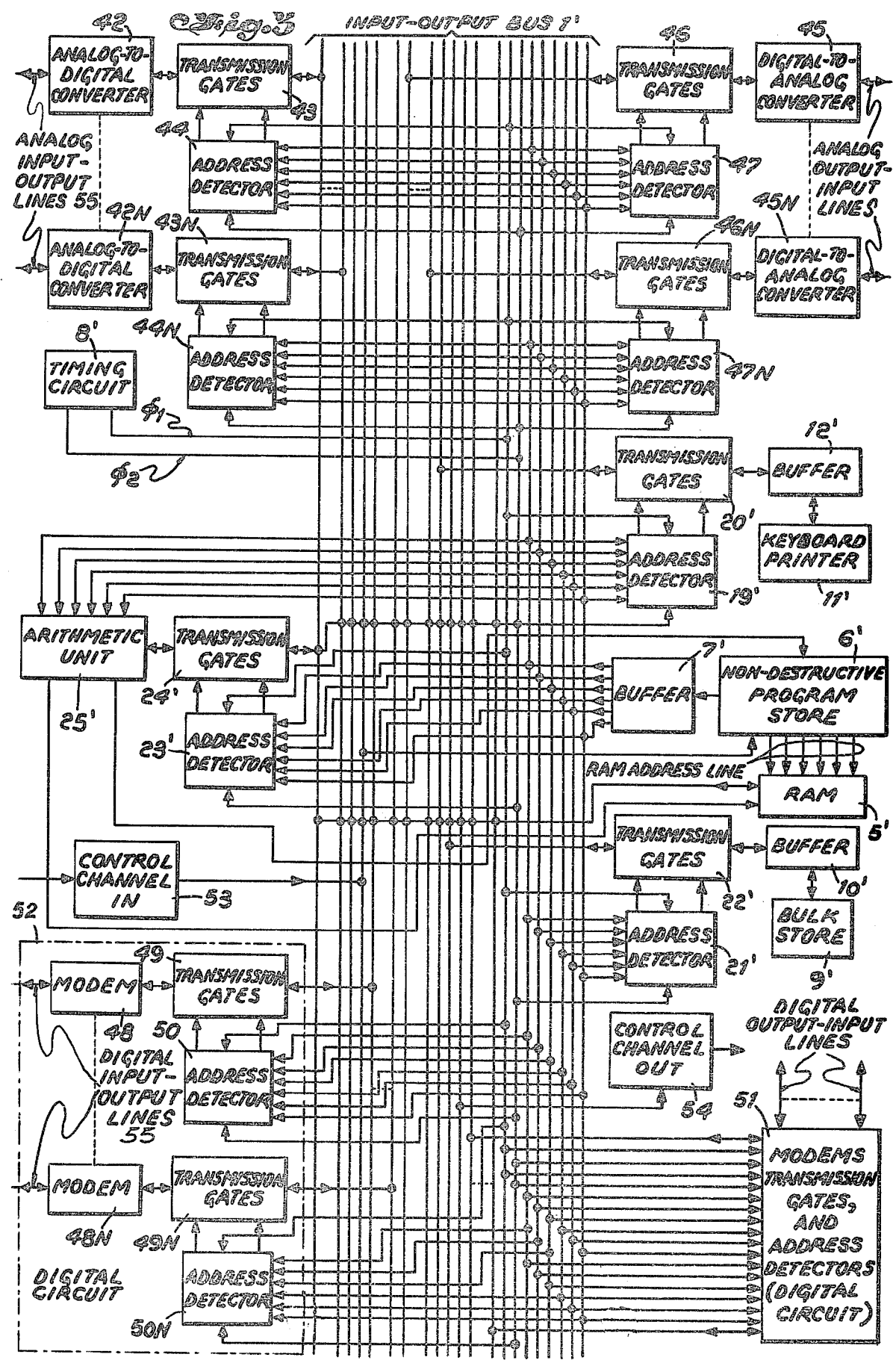

PCM TIME SLOT EXCHANGE

BACKGROUND OF THE INVENTION

This invention relates to communication exchanges and more particularly to PCM (pulse code modulation) exchanges.

SUMMARY OF THE INVENTION

An object of the present invention is to provide an improved PCM time slot exchange.

A feature of the present invention is the provision of a time slot exchange for a plurality of peripheral information units comprising: first means having a plurality of lines, predetermined ones thereof each being coupled to a different one of the units; second means coupled to each of the predetermined ones of the plurality of lines to sequentially write the information in the exchange therein, to store the information in the exchange therein and to read the information in the exchange therefrom selectively on command; and third means coupled to the second means to selectively command the second means and coupled to others of the plurality of lines which are in turn coupled to the first means to selectively control the routing of the information through the exchange to a selected one of the units.

A further feature of the present invention is the provision in addition to the previous feature of a fourth means coupled to further ones of the plurality of lines to provide an incoming timing signal and an outgoing timing signal cooperating with the third means to selectively control the passage of the information through the exchange to a selected one of the units.

Another feature of the present invention is the provision, in addition to the above two features, of a fifth means coupled to each of the predetermined ones of the plurality of lines, the second means and the third means with the fifth means performing a parity check on the information on an addressed one of the predetermined ones of the plurality of lines and controlling the second means and the third means dependent upon the results of the parity check.

BRIEF DESCRIPTION OF THE DRAWING

Above-mentioned and other features and objects of this invention will become more apparent by reference to the following description taken in conjunction with the accompanying drawing, in which:

FIG. 1 is a block diagram of a PCM time slot exchange in accordance with the principles of the present invention;

FIG. 2 illustrates a portion of the program in the program store of FIGS. 1 and 3; and FIG. 3 is a block diagram of a time assignment speech interpolation (TASI) system employing the basic components of FIG. 1 in accordance with the principles of the present invention.

DESCRIPTION OF THE PREFERRED EMBODIMENT

Referring to FIG. 1, the basic components of the exchange of the present invention are (1) the input-output bus 1 including information or data lines 2 and their associated transmission gates and address detectors, unit address lines 3 and timing lines 4, (2) random access memory (RAM) 5 and (3) the non-destructive program store 6 in association with its buffer 7. Store 6 may be a magnetic tape with a magnetic tape reader, a perforated tape with a perforated tape reader, a disc with a disc reader and so forth.

Timing circuit 8 provides two phases of timing signals $\phi_1$ and $\phi_2$, which are coupled respectively to timing lines 4. The purpose of these timing signals is to keep everything in the exchange operating in an orderly fashion. Incoming peripheral units are enabled by timing signal $\phi_1$ and outgoing peripheral units are enabled by timing signal $\phi_2$.

The program of store 6 as illustrated in FIG. 2 includes for incoming information a sequence of a peripheral unit address and a RAM address at time $\phi_1$ for incoming peripheral units; and a sequence of a peripheral unit address and a RAM address at time $\phi_2$ for outgoing peripheral units. Thus, the program is a predetermined sequence of a plurality of addresses with each of the plurality of addresses including a unit address followed by a RAM address during each of the timing signals $\phi_1$ and $\phi_2$ to provide an orderly routing of data through the exchange for a particular system specification. Each system specification would have its own sequence of plurality of addresses to carry out the end results desired.

The peripheral units controlled by the exchange of this invention includes bulk store 9 and its associated buffer 10, printer/keyboard 11 and its buffer 12, modem (modulator and demodulator) 13 and input-output line connected to interface circuit 14.

Each of these peripheral units have associated therewith for control thereof by the exchange of the present invention an address detector 15 and transmission gate 16 coupled to interface circuit 14, address detector 17 and transmission gate 18 coupled to modem 13, address detector 19 and transmission gate 20 coupled to printer/keyboard 11 and address detector 21 and transmission gate 22 coupled to bulk store 9. Address detector 23 and transmission gate 24 are associated with an arithmetic unit 25 which corrects errors that may be present in the information on the addressed one of data lines 2. Arithmetic unit 25 is a simple parity check circuit, many of which are well known in the art. Unit 25 checks the parity of the information or data on the data lines 2 and if the parity is all right, arithmetic unti 25 repeats the RAM address. If the parity is not all right, a special address is overwritten the present address of program 6 and places the erroneous data in a special portion of store 6 and/or operates an alarm 26 when switch 27 is closed.

RAM 5 requires the same address as the address placed on unit address lines 3 and this may be provided by employing switches 27, 28, 29 and 30 when placed in the position opposite to that shown. When switches 27–30 are in the position shown the input-output bus 1 will then include the RAM address lines 31.

The logic components of a typical address detector are shown in address detector 15. Detector 15 includes a four input AND gate 32, the output of which is coupled to AND gates 33 and 34, with the output of AND gate 33 enabling the coupling of information through AND gate 35 into the exchange and AND gate 34 enabling the removal of information from the exchange by AND gate 36. AND gates 35 and 36 are the logic components of all the transmission gates of the exchange illustrated in FIG. 1.

Whenever one of the unit address lines 3 contains a logic "0", an inverter is coupled between that line of lines 3 to the input of AND gate 32 as illustrated by inverters 37 and 38 of address detector 15. The input of the four input AND gate 32 having zero presented thereto from lines 3 determines the location of the inverter so that the four input AND gate can be enabled by having logic "1" coupled to all its inputs.

The operation of the exchange of FIG. 1 will be explained by a single example. Assume that the address of the program of store 6 is 0011 and timing signal $\phi_1$ is present. This will enable AND gates 33 and 35 and thereby permit the information from circuit 14 to be placed on the line 39 of data lines 2. The information on line 39 will be coupled to RAM 5 and stored therein during the RAM address portion of the timing signal $\phi_1$ as shown in FIG. 2. Assume that it is desired to have the information on line 39 coupled to modem 13. In this case the program in store 6 would have a 1011 address therein which is detected by address detector 17, with this address being coupled to RAM 5 during the unit address portion of time $\phi_2$. Then during the RAM address portion of timing signal $\phi_2$ the information stored in RAM 5 is coupled to line 41 of data lines 2 and, hence, to transmission gates 18 and modem 13. It should be noted that the RAM 5 is "write enabled" during timing signal $\phi_1$ and "read enabled" during timing signal $\phi_2$ as illustrated in FIG. 2.

As can be appreciated, there are many different ways the information from the peripheral units can be routed through the exchange of FIG. 1 depending upon the presently arranged program stored in non-destructive program store 6 which is orderly arranged to provide an orderly routing of information from one desired peripheral unit to another desired peripheral unit which may be the same peripheral unit from which information is entered into the exchange.

Referring to FIG. 3, there is illustrated therein a block diagram of a TASI system including therein the three basic components of the exchange of the present invention in addition to the peripheral units employed in the exchange of FIG. 1. Again the basic units of the exchange for the TASI system includes input-output bus 1', RAM 5' and non-destructive program store 6' with its associated buffer 7'. The program in store 6' is similar to that described with respect to FIGS. 1 and 2 but will be a longer program due to the more units having information necessary to be routed through the exchange of FIG. 3. As in FIG. 1, timing circuit 8' is provided to generate timing signals $\phi_1$ and $\phi_2$ to provide an orderly operation of the exchange to route information from the peripheral units for storage in the RAM 5' and then reading out the store information from RAM 5' to the addressed peripheral unit.

The transmission gates and address detectors employed in the exchange for the TASI system of FIG. 3 have the same logic circuit as illustrated for address detector 15 and transmission gate 16 of FIG. 1, with the exception that since there are more peripheral units due to the TASI system, the address now contains six binary bits rather than the four binary bits employed in the arrangement of FIG. 1, and as a result, the AND gate of the address detectors similar to AND gate 32 is a six input AND gate.

The speech portion of the TASI system connected to the exchange of FIG. 3 includes an input-output portion having analog-to-digital converters 42-42N, together with their transmission gates 43-43N and their address detectors 44-44N and an output-input portion having digital-to-analog converters 45-45N and their associated transmission gates 46-46N and address detectors 47-47N. The digital portion of the TASI system includes a digital input-output portion having modems 48-48N and their associated transmission gates 49-49N and address detectors 50-50N and a digital output-input portion having digital circuit 51 which includes the same components as digital circuit 52 of the digital input-output portion of the TASI system.

In accordance with the TASI operation, digital data is inserted in the speech signal during pauses in the speech signal on one of the analog input-output lines 55. These pauses are indicated to the exchange of FIG. 3 by control channel in 53, the output of which is coupled to RAM 5' for storage therein and also to program store 6'. Store 6' would be switched to a different address portion of the program so that the digital data can be transmitted through the digital circuits 51 and 52 on the line of lines 55 in which the pause has occurred. The control signal from control channel in 53 is read out of the RAM 5' during the RAM address portion of the timing signal $\phi_2$ and coupled to control channel out 54 to be used in subsequent exchanges to indicate the presence of a pause in the speech so that digital data may be transmitted during the pause.

While I have described above the principles of my invention in connection with specific apparatus it is to be clearly understood that this description is made only by way of example and not as a limitation to the scope of my invention as set forth in the objects thereof and in the accompanying claims.

I claim:

1. A time slot exchange for a plurality of peripheral information units comprising:
   first means having a plurality of lines, predetermined ones thereof each being coupled to a different one of said units;
   second means coupled to each of said predetermined ones of said plurality of lines to sequentially write information in said exchange therein, to store said information in said exchange therein and to read said stored information in said exchange therefrom selectively on command; and
   third means coupled to said second means to selectively command said second means and coupled to others of said plurality of lines which are in turn coupled to said first means to selectively control the routing of said information through said exchange to a selected one of said units.

2. An exchange according to claim 1, further including
   fourth means coupled to further ones of said plurality of lines to provide an incoming timing signal and an outgoing timing signal cooperating with said third means to selectively control the passage of said information through said exchange to said selected one of said units.

3. An exchange according to claim 2, wherein said first means includes
   an input-output bus where said predetermined ones of said plurality of lines are information lines equal in number to said units, said other of said plurality of lines are address lines, and said further ones of said plurality of lines are a pair of timing lines, one of said pair of lines conducting thereon said incoming timing signals and the other of said pair of lines conducting thereon said outgoing timing signals.

4. An exchange according to claim 3, wherein said first means further includes a plurality of address detectors equal in number to said units each coupled to said address lines and said timing lines, and a plurality of transmission gates equal in number to said units each coupled between a different one of said units and said address detectors.

5. An exchange according to claim 4, wherein said second means includes a random access memory coupled to said third means and each of said information lines.

6. An exchange according to claim 5, wherein said third means includes a non-destructive program store coupled to said random access memory and said address lines, said store storing a predetermined sequence of data bits to provide in sequence an incoming address for one of said address detectors, an incoming address for said random access memory, an outgoing address for another of said address detectors which may be said one of said address detectors, and an outgoing address for said random access memory.

7. An exchange according to claim 6, further including fifth means coupled to each of said information lines, said random access memory and said program store, said fifth means performing a parity check on said information on an addressed one of said information lines and controlling said random access memory and said program store dependent upon the results of said parity check.

8. An exchange according to claim 7, wherein said first, second, third, fourth and fifth means are employed in a time assignment speech interpolation system.

9. An exchange according to claim 8, wherein said information in said exchange is pulse code modulation data.

10. An exchange according to claim 1, wherein said first means includes an input-output bus where said predetermined ones of said plurality of lines are information lines equal in number to said units, said other of said plurality of lines are address lines, and an additional pair of timing lines, one of said pair of lines conducting thereon an incoming timing signal and the other of said pair of lines conducting thereon an outgoing timing signal.

11. An exchange according to claim 10, wherein said first means further includes a plurality of address detectors equal in number to said units each coupled to said address lines and said timing lines, and a plurality of transmission gates equal in number to said units each coupled between a different one of said units and said address detectors.

12. An exchange according to claim 11, wherein said second means includes a random access memory coupled to said third means and each of said information lines.

13. An exchange according to claim 12, wherein said third means includes a non-destructive program store coupled to said random access memory and said address lines, said store storing a predetermined sequence of data bits to provide in sequence an incoming address for one of said address detectors, an incoming address for said random access memory, an outgoing address for another of said address detectors which may be said one of said address detectors, and an outgoing address for said random access memory.

14. An exchange according to claim 13, further including fourth means coupled to each of said information lines, said random access memory and said program store, said fourth means performing a parity check on said information on an addressed one of said information lines and controlling said random access memory and said program store dependent upon the results of said parity check.

15. An exchange according to claim 14, wherein said first, second, third and fourth means are employed in a time assignment speech interpolation system.

16. An exchange according to claim 15, wherein said information in said exchange is pulse code modulation data.

17. An exchange according to claim 1, wherein said first means includes a plurality of address detectors equal in number to said units each coupled to address lines and timing lines, and a plurality of transmission gates equal in number to said units each coupled between a different one of said units and said address detectors.

18. An exchange according to claim 1, wherein said second means includes a random access memory coupled to said third means and all information lines.

19. An exchange according to claim 18, wherein said third means includes a non-destructive program store coupled to said random access memory and address lines, said store storing a predetermined sequence of data bits to provide in sequence an incoming address for one of said address detectors, an incoming address for said random access memory, an outgoing address for another of said address detectors which may be said one of said address detectors, and an outgoing address for said random access memory.

20. An exchange according to claim 19, further including fourth means coupled to each of said information lines, said random access memory and said program store, said fourth means performing a parity check on said information on an addressed one of said information lines and controlling said random access memory and said program store dependent upon the results of said parity check.

21. An exchange according to claim 20, wherein said first, second, third and fourth means are employed in a time assignment speech interpolation system.

22. An exchange according to claim 1, wherein said third means includes a non-destructive program store coupled to said second means and address lines, said store storing a predetermined sequence of data bits to provide in sequence an incoming address for one of said address detectors, an incoming address for said random access memory, an outgoing address for another of said address detectors which may be said one of said address detectors, and an outgoing address for said random access memory.

23. An exchange according to claim 22, further including
fourth means coupled to all information lines, said second means and said program store, said fourth means performing a parity check on said information on an addressed one of said information lines and controlling said second means and said program store dependent upon the results of said parity check.

24. An exchange according to claim 23, wherein
said first, second, third and fourth means are employed in a time assignment speech interpolation system.

25. An exchange according to claim 1, further including
fourth means coupled to all information lines, said second means and said third means, said fourth means performing a parity check on said information on an addressed one of said information lines and controlling said second means and said third means dependent upon the results of said parity check.

26. An exchange according to claim 25, wherein
said first, second, third and fourth means are employed in a time assignment speech interpolation system.

27. An exchange according to claim 1, wherein
said first, second and third means are employed in a time assignment speech interpolation system.

* * * * *